3,542,916
WATER DISPERSIBLE NITROFURAN COMPOSITIONS AND METHOD OF PREPARING THE SAME
James A. Campbell, Ashland, Ohio, assignor to Richardson-Merrell Inc., New York, N.Y., a corporation of Delaware
No Drawing. Filed Aug. 15, 1967, Ser. No. 660,581
Int. Cl. A61k 9/00, 27/00
U.S. Cl. 424—37                               13 Claims

ABSTRACT OF THE DISCLOSURE

Compositions of micronized water-insoluble nitrofurans which are readily dispersible in water to form stable suspensions of the nitrofuran are prepared by coating the micronized nitrofuran particles with partially hydrolyzed gelatin and drying to obtain a powder having a bulk density of about 0.5 gram per cubic centimeter and an average particle size of about 60 mesh. The compositions may also contain dispersing aids, such as sugar, and sequestering agents, such as sodium citrate, to counteract adverse effects of naturally occurring mineral salts and other materials in water.

BACKGROUND OF THE INVENTION

A large number of 2-substituted-5-nitrofurans have been described which have activity against a broad spectrum of pathogenic bacteria, protozoa, and fungi. Several of these are in widespread use for the prevention and treatment of infections in animals, particularly those caused by intestinal parasites of the Salmonella group such as *Salmonella typhimurium, Salmonella paratyphi, Salmonella choleraesuis, Salmonella dublin,* and the like. The microorganisms infect a large number of different kinds of animals such as chickens, turkeys, ducks, swine, cattle, sheep, dogs, and cause huge losses. Prophylactic and therapeutic treatment of the animals is commonly undertaken by including one of the effective nitrofurans in the animals' diet.

Because some animals stop eating when they become ill but continue to drink water, it is preferred that the drug be administered in the drinking water. In the case of most of the nitrofurans, however, it is inconvenient, or virtually impossible to dissolve them in water in therapeutic concentrations on account of their low solubility. Some of the most effective nitrofurans, for instance, have a solubility in water of only 1 part in 25,000. Although attempts have been made to solubilize the therapeutically effective nitrofurans or to prepare stable suspensions of them in water, the results have not been completely satisfactory.

A composition which is satisfactory for preparing aqueous dispersions of nitrofurans suitable for administering these drugs in the animals' drinking water at effective therapeutic levels must meet a number of important requirements. For example, the composition should be one that is easily dispersed at effective concentrations. Preferably the composition should be dispersible in water at levels substantially above the therapeutic level of the drug in poultry drinking water so that concentrated dispersions of the drug can be prepared and fed automatically to the birds' drinking water as required during the day. Automatic mixing and dispensing apparatus is available for mixing concentrated medication in drinking water at the rate of one ounce of the concentrate to one gallon of water. To provide medicated drinking water at concentrations of nitrofurans which are effective, that is, about 0.01 percent by weight of the drug, the concentrate would have to contain approximately 1.28 percent of the drug. The nitrofuran should be stable in the concentrate to the extent of about 85 percent of the drug remaining in the dispersion over a period of eight hours.

The material should be in the form of a powder rather than a liquid for ease of handling, shipping, low cost of containers, and for other economic reasons. The material should not be liable to damage by freezing or action by bacteria. It should be stable on storage without losing its dispersibility or therapeutic effectiveness. The bulk density should be sufficiently high so that large packages are not needed.

None of the ingredients, other than the drug itself, should have a pharmacological activity of its own nor should any of the components of the preparation be capable of acting upon the drug and altering its potency.

The composition, when dissolved in water, should not corrode metal containers in which the solution is dispersed or made available to the birds. The composition should be free from odor and taste so that the birds will not be discouraged from drinking the medicated water.

The suspension should not be affected by mineral salts and other natural components of the drinking water which may vary considerably in various parts of the country.

Finally, the composition must be inexpensive. All of these criteria are met by the new compositions of the present invention.

SUMMARY OF THE INVENTION

The foregoing objectives are achieved by the new compositions of the present invention which are prepared by coating substantially water-insoluble, therapeutically effective 2-substituted-5-nitrofurans which have been previously micronized with partially hydrolyzed gelatin and drying to a powder as will be described hereinafter. Dispersing, buffering, and sequestering agents may be added if desired.

DESCRIPTION OF PREFERRED EMBODIMENTS

To prepare the new compositions of the present invention, gelatin, preferably food grade of low bloom, is hydrolyzed to a suitable viscosity. Hydrolysis may be carried out with the aid of acids, heat, proteolytic enzymes, or combinations of these agents. The degree of hydrolysis should be such that a 50 percent solution in water at 25° C. has a viscosity of 3,000 centipoises, or less, when measured in a Brookfield viscometer using a No. 4 spindle at 30 revolutions per minute at 25° C.

For example, 50 grams of gelatin (type A, low bloom), 50 grams of distilled water, and 5 grams of citric acid were heated at 80° C. for twenty hours to hydrolyze the gelatin and to reduce the viscosity of the solution to a workable level, that is, 3,000 centipoises, as noted above.

The hydrogen ion concentration of the solution was adjusted to pH 7 with aqueous sodium hydroxide. Twenty (20) grams of 65 percent corn syrup was added to the solution followed by the addition of 10 grams of micronized furazolidone. The preparation was subjected to high shear mixing for five minutes and then dried.

One suitable method of drying the nitrofuran suspensions is by spray drying. A number of batches of product were prepared by spray drying the above-described suspensions in a countercurrent spray dryer using direct gas heat. The inlet temperatures varied from 350° F. to 500° F. with the outlet temperatures ranging from about 180° F. to 270° F. The air pressure varied from 15 to 85 pounds per square inch at the nozzle.

Although the bulk density of the final product can be varied considerably by adjusting the several conditions of the spray dryer, it is preferred that the product have a bulk density of about 0.5 gram per cubic centimeter and an average particle size of about 60 mesh (United States Standard Sieve Specification—openings 0.25 millimeter, wire diameter 0.180 millimeter) or less. The bulk density may vary considerably, but the product should not be too bulky, that is, less than about 0.1 gram per cubic centimeter. Preferably, none of the particles should have a size larger than 40 mesh.

The importance of preparing easily water-dispersible nitrofuran preparations can be appreciated from the fact that furazolidone, one of the most commonly used nitrofurans in treating animal diseases, has a water solubility of only 1 part in 25,000, or 0.004 percent. The therapeutic level should be at least 0.005 percent, and it is preferred that the concentration be a little stronger than this—about 75 milligrams of the drug per liter of drinking water. Obviously, when a concentrate is prepared for use with automatic dispensers, as can be the compositions of the present invention, the concentrate would have to contain about 1.28 percent of the nitrofuran.

The invention is particularly adapted to the preparation of water-dispersible compositions in which various therapeutically effective water-insoluble nitrofurans are used. The preferred nitrofurans are nitrofurazone, furazolidone, and nihydrazone. Other water-insoluble therapeutically effective nitrofurans can also be used in preparing compositions of the present invention.

The water-insoluble nitrofurans should be micronized to an average particle size of less than 15 microns before suspending in the hydrolyzed gelatin solution.

The ratio of the nitrofuran to gelatin in the preparations may vary from about 5 parts of nitrofuran per 100 parts of gelatin to 25 parts of nitrofuran per 100 parts of gelatin. The optimum proportion has been found to be 10 parts of the nitrofuran per 100 parts of gelatin.

Although corn syrup was used in preparing the solutions described above, other sugars such as dextrose, fructose, sucrose, and the like can be used. These sugars have a desirable wetting and dispersing action but could be omitted if desired. The quantity of the sugar may vary from about 50 percent to 300 percent by weight of the nitrofuran.

Although the pH of the solution was adjusted to 7.0 prior to drying in the above example, the solution to be dried can have a pH between 4.7 and 7 and can be adjusted to within this range by any suitable non-toxic base or acid.

It is preferred that small amounts of a metal ion sequestering agent such as sodium citrate or sodium diethylenediamine tetraacetate be mixed with the above-described dry composition, in amounts up to about one half of the weight of the dry powder, to provide about 100 milligrams per liter of the sequestering agent in the medicated drinking water. These sequestering agents act as stabilizing agents in the event that the drinking water with which the compositions are mixed contains certain metal ions which might otherwise tend to prematurely precipitate the suspended nitrofuran.

The novel compositions of the present invention may be used to prepare prophylactic and therapeutic suspensions of water-insoluble nitrofurans by simply stirring a desired quantity in water. The compositions are dispersible far above any required drug level with only a few minutes of stirring.

Furazolidone suspensions when prepared as described herein will remain stable in drinking water to the extent of 85 percent to 88 percent after seven hours and 64 percent to 68 percent at twenty-four hours at therapeutic levels. The use of dispersions of nitrofurans in the prophylactic and therapeutic treatment of birds and other animals at various drug levels for various treatments is well known and need not be described.

What is claimed is:

1. A therapeutic composition in the form of a finely divided powder having an average particle size of less than 60 mesh and a bulk density of about 0.1 to 0.5 gram per cubic centimeter which comprises 5 to 25 parts by weight of a micronized therapeutically effective water-insoluble 2-substituted-5-nitrofuran having a particle size of less than about 15 microns, the said particles being coated with dried, partially hydrolyzed gelatin, said gelatin having been hydrolyzed to a viscosity of less than 3000 centipoises at 50 percent concentration in water at 25° C., in an amount of about 100 parts by weight, said composition being easily dispersible in water to provide a liquid dispersion having a concentration of approximately 1.28 percent by weight of the nitrofuran contained therein and stable to the extent that about 85 percent by weight of the nitrofuran will remain in suspension in the water for a period of eight hours.

2. A composition in accordance with claim 1 in which the micronized nitrofuran particles are coated with a composition comprising partially hydrolyzed gelatin and one-half to three times the weight of the nitrofuran contained therein of a water-soluble sugar.

3. A composition in accordance with claim 1 in which the composition contains up to one-half of its total dry weight of a metal ion chelating agent selected from the group consisting of sodium citrate and sodium diethylenediamine tetraacetate.

4. A composition in accordance with claim 3 in which the chelating agent is sodium citrate.

5. A composition in accordance with claim 2 in which the nitrofuran is nitrofurazone.

6. A composition in accordance with claim 2 in which the nitrofuran is furazolidone.

7. A composition in accordance with claim 2 in which the nitrofuran is nihydrazone.

8. A method of preparing a therapeutic composition comprising a therapeutically effective water-insoluble 2-substituted-5-nitrofuran which is dispersible in water to the extent of approximately 1.28 percent by weight of nitrofuran to form a suspension of said nitrofuran stable to the extent of about 85 percent by weight of the nitrofuran for a period of eight hours which comprises the step of preparing an aqueous suspension containing 100 parts by weight of gelatin hydrolyzed to a viscosity of less than 3,000 centipoises at 50 percent concentration in water at 25° C., 5 to 25 parts by weight of a therapeutically effective water-insoluble nitrofuran having a particle size of less than 15 microns, and one-half to three times the weight of the nitrofuran of a water-soluble sugar, adjusting the hydrogen ion concentration of the solution to between pH 4.7 and pH 7.0 and spray drying said solution to obtain a powder having a bulk density of about 0.5 gram per cubic centimeter and an average particle size of less than 60 mesh.

9. A method in accordance with claim 8 in which a metal ion chelating agent selected from the group consisting of sodium citrate and sodium diethylenediamine tetraacetate is mixed with said dried powder in amounts up to one-half of the weight of said dried powder.

10. A method in accordance with claim 8 in which the therapeutically effective water-insoluble nitrofuran is nitrofurazone.

11. A method in accordance with claim 8 in which the therapeutically effective water-insoluble nitrofuran is furazolidone.

12. A method in accordance with claim 8 in which the therapeutically effective water-insoluble nitrofuran is nihydrazone.

13. A method in accordance with claim 9 in which the chelating agent is sodium citrate.

References Cited

UNITED STATES PATENTS

| | | | |
|---|---|---|---|
| Re. 24,899 | 11/1860 | Green | 252—363.5 |
| 1,161,690 | 11/1915 | Kawai et al. | 424—37 |
| 2,416,234 | 2/1947 | Stillman et al. | 424—285 |
| 2,650,895 | 9/1953 | Wallenmeyer et al. | 99—2 |
| 2,853,421 | 9/1958 | Adams et al. | 424—37 |
| 3,026,332 | 3/1962 | Holland et al. | 424—227 |
| 3,075,876 | 1/1963 | Stark et al. | 424—272 |
| 3,124,510 | 3/1964 | Rosenberg | 424—360 |
| 3,138,532 | 6/1964 | Aiello et al. | 99—2 |

ALBERT T. MEYERS, Primary Examiner

F. E. WADDELL, Assistant Examiner

U.S. Cl. X.R.

424—272, 285